F. NAUMANN.
CALCULATING MACHINE.
APPLICATION FILED OCT. 27, 1909.
967,821.
Patented Aug. 16, 1910
7 SHEETS—SHEET 2.
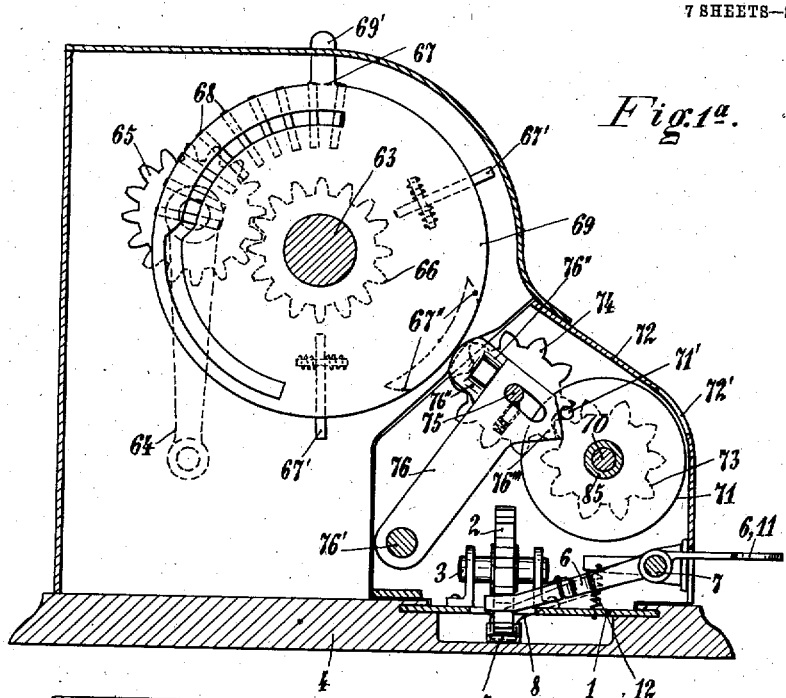
Fig. 1ª.
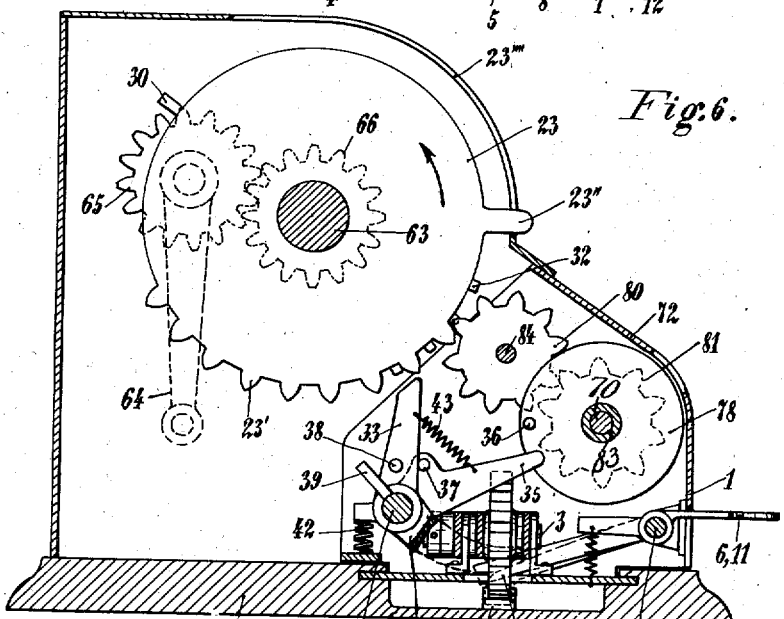
Fig. 6.
Witnesses:
Inventor
Friedrich Naumann
James L. Norris

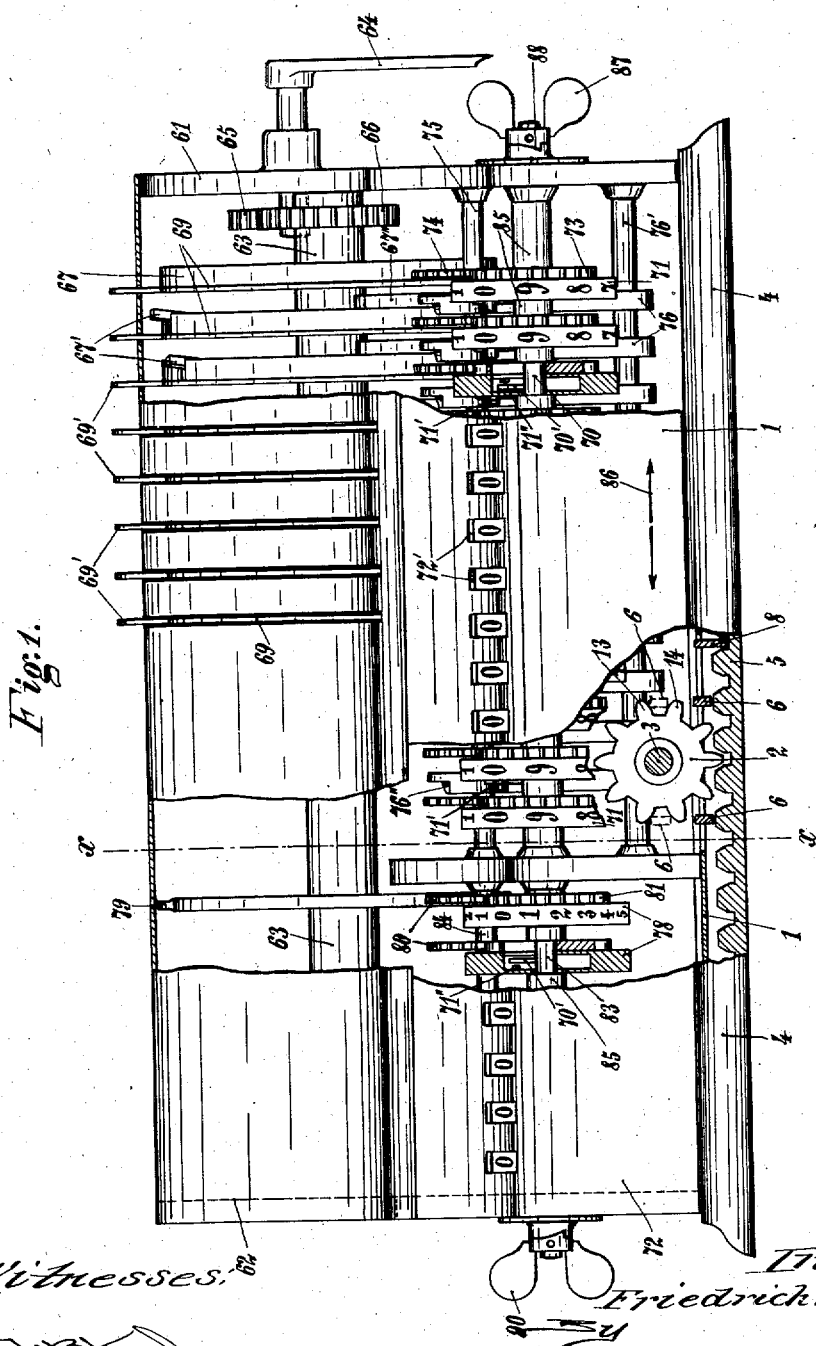

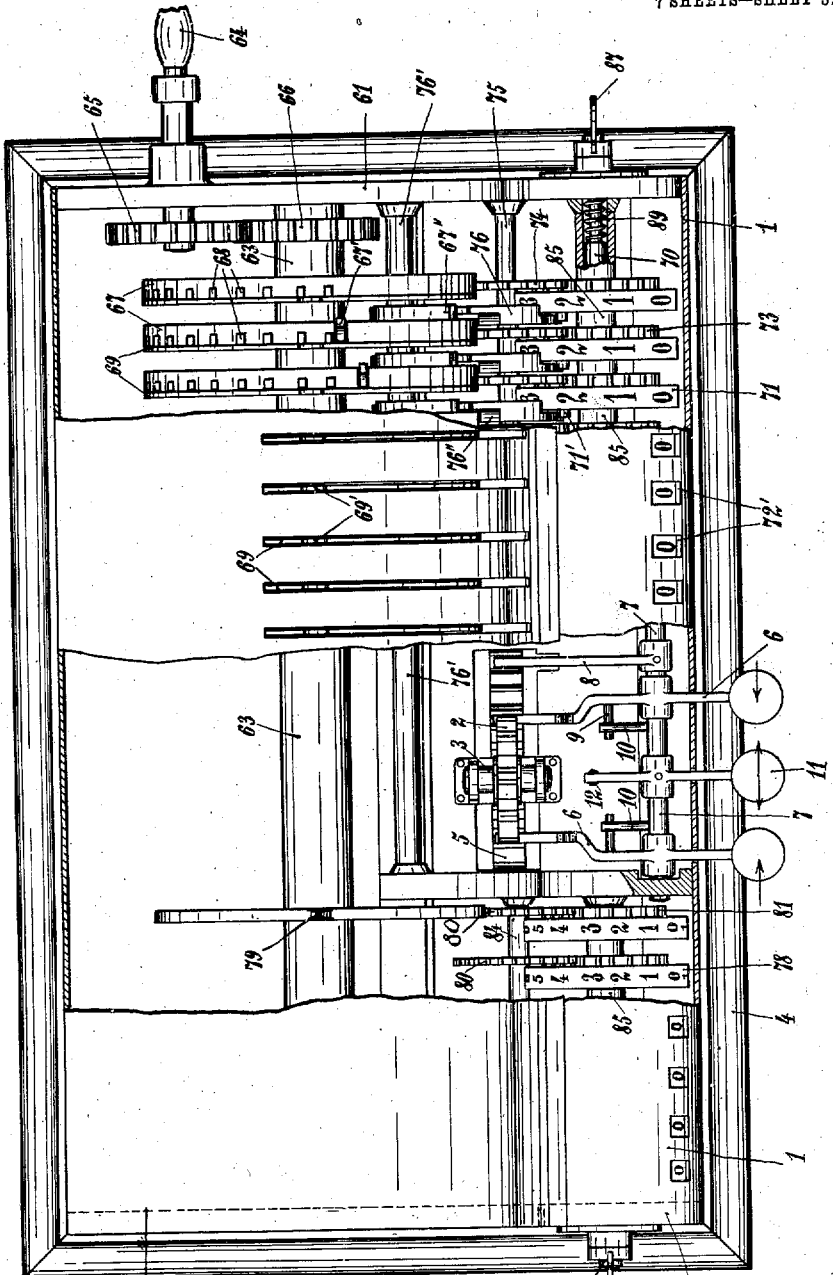

F. NAUMANN.
CALCULATING MACHINE.
APPLICATION FILED OCT. 27, 1909.

967,821.

Patented Aug. 16, 1910.

7 SHEETS—SHEET 4.

Witnesses:

Inventor
Friedrich Naumann
James L. Norris
atty

F. NAUMANN.
CALCULATING MACHINE.
APPLICATION FILED OCT. 27, 1909.

967,821.

Patented Aug. 16, 1910.
7 SHEETS—SHEET 5.

Witnesses:

Inventor
Friedrich Naumann
James L. Norris

F. NAUMANN.
CALCULATING MACHINE.
APPLICATION FILED OCT. 27, 1909.
967,821.
Patented Aug. 16, 1910.
7 SHEETS—SHEET 6.
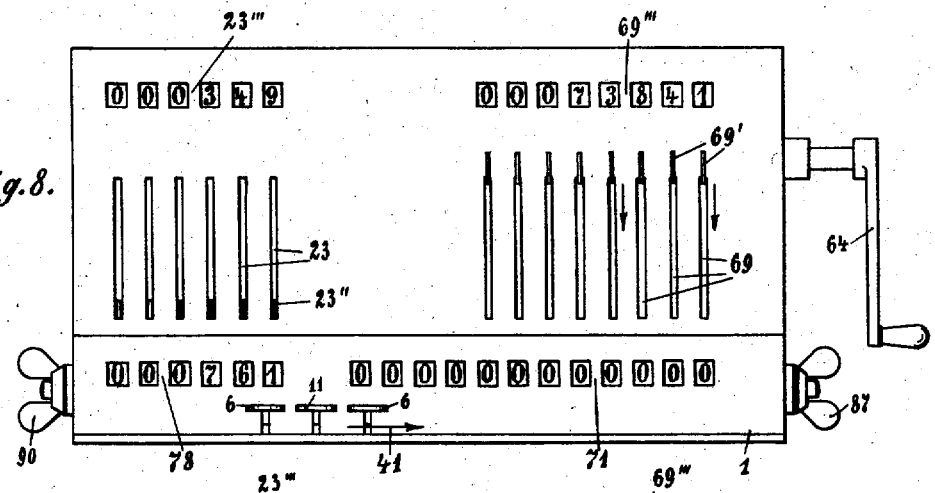
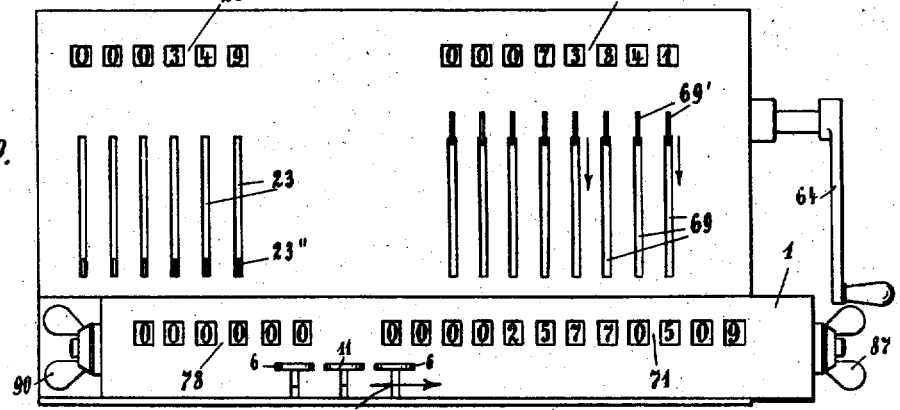
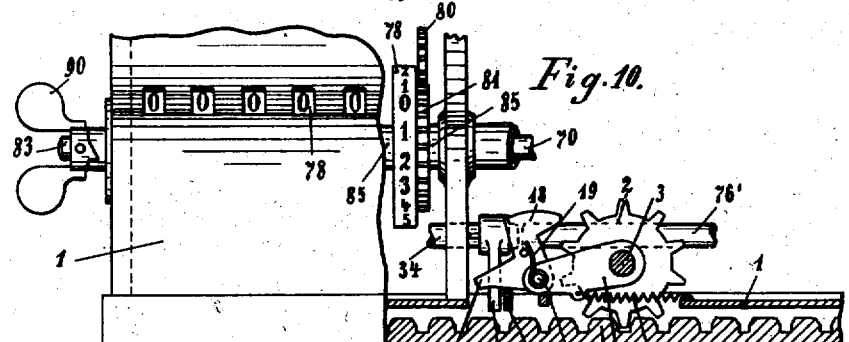
Witnesses:
Inventor
Friedrich Naumann
By James L. Norris
Atty

F. NAUMANN.
CALCULATING MACHINE.
APPLICATION FILED OCT. 27, 1909.

967,821.

Patented Aug. 16, 1910.
7 SHEETS—SHEET 7.

Witnesses:

Inventor
Friedrich Naumann
By James L. Norris
Atty

UNITED STATES PATENT OFFICE.

FRIEDRICH NAUMANN, OF HAGEN, GERMANY, ASSIGNOR TO GRIMME, NATALIS & CO., KOMMANDITGESELLSCHAFT AUF AKTIEN, BRAUNSCHWEIG, OF HAGEN, GERMANY, A CORPORATION OF GERMANY.

CALCULATING-MACHINE.

967,821.  Specification of Letters Patent.  Patented Aug. 16, 1910.

Application filed October 27, 1909. Serial No. 524,816.

*To all whom it may concern:*

Be it known that I, FRIEDRICH NAUMANN, technician, a subject of the Emperor of Germany, residing at Hagen, Province of Westphalia, Kingdom of Prussia, Empire of Germany, have invented certain new and useful Improvements in Calculating-Machines, of which the following is a specification.

This invention relates to improvements in calculating machines and more particularly to that class of calculating machines, in which the values of the calculations are set on setting disks having a variable number of teeth adapted to transmit the said values to a registering mechanism which is mounted on a slidable carriage adapted to be shifted laterally along the setting mechanism, so that its registering elements or numeral wheels can be brought into coöperation with any of the setting-disks of the setting mechanism. And one of the objects of the improvements is to provide simple and convenient means for shifting the carriage. With this and other objects in view the invention consists of the combinations of elements described hereinafter and particularly pointed out in the appended claims.

For the purpose of explaining the invention several examples embodying the same have been shown in the accompanying drawings in which the same letters of reference have been used in all the views to indicate corresponding parts.

Figure 3:
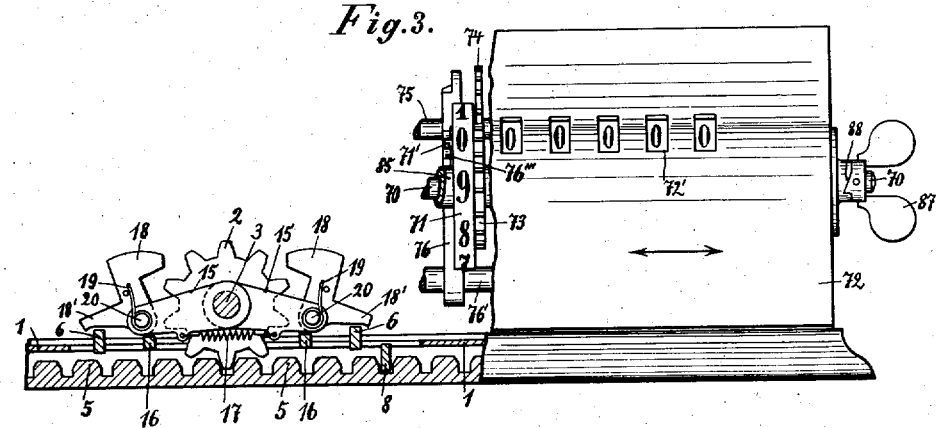
Figure 4:
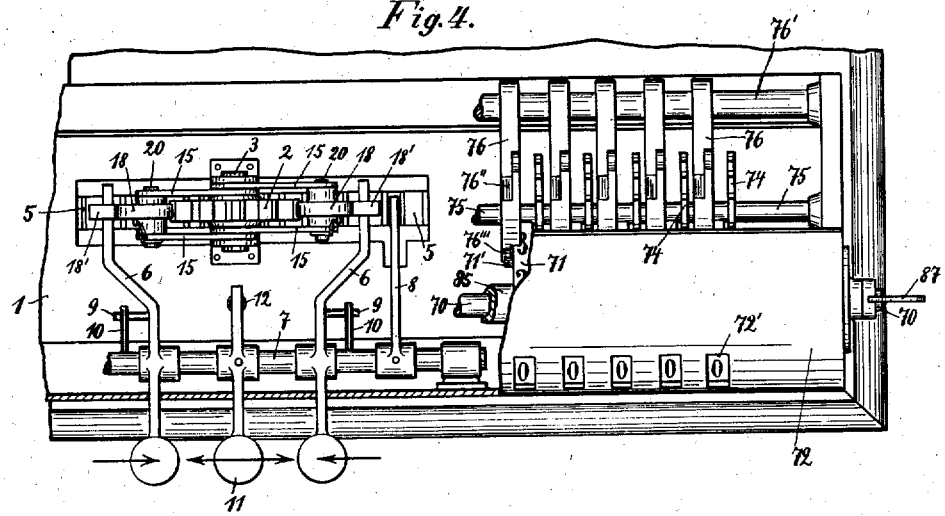
Figure 5:
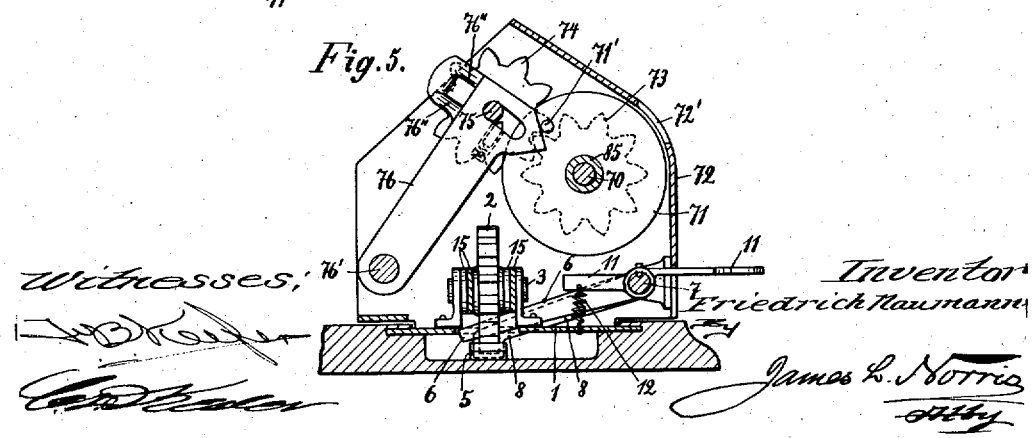
Figure 7:
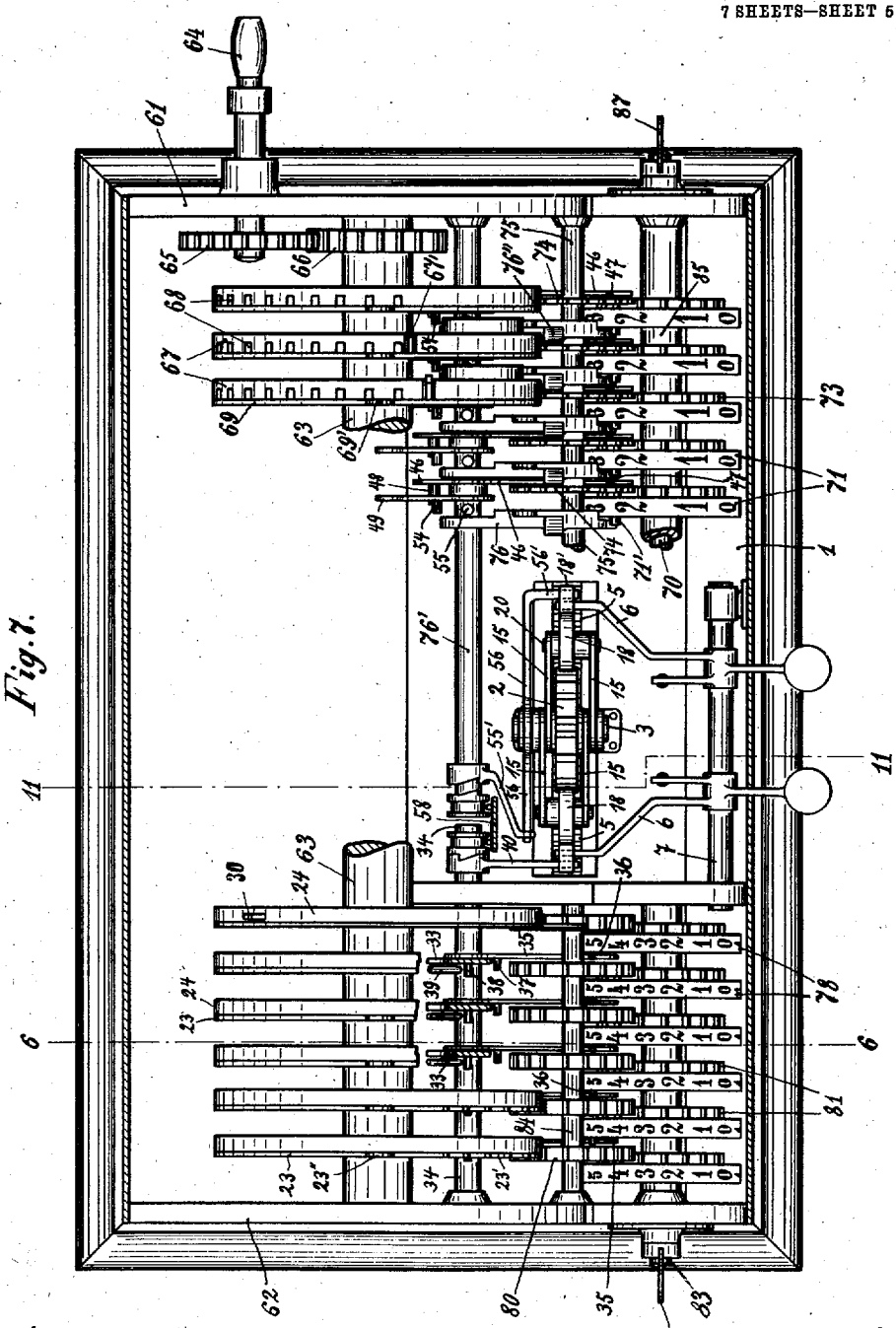
Figure 11:
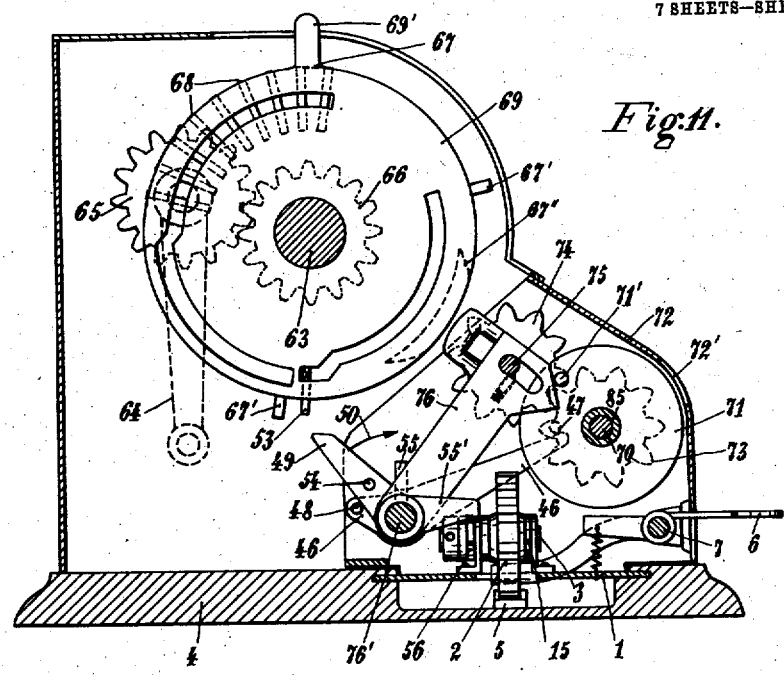
Figure 12:
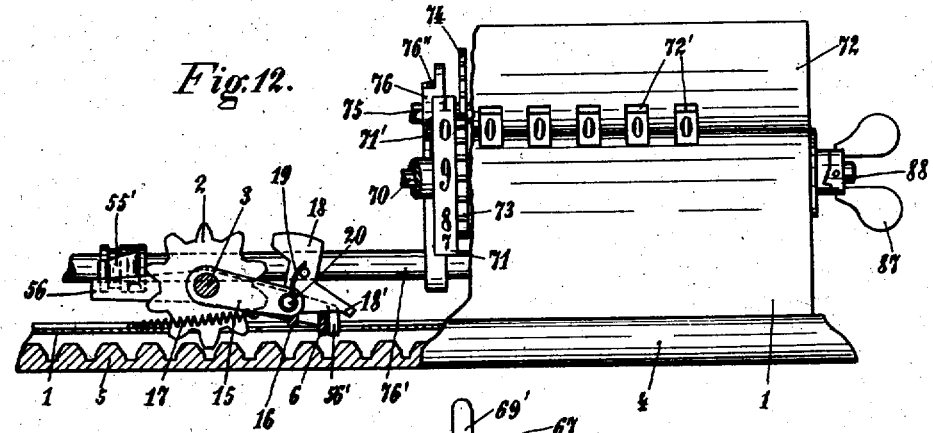
Figure 13:
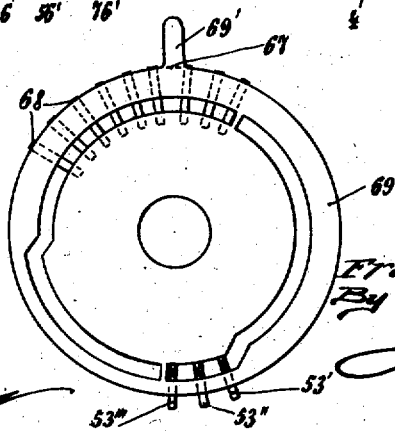

In said drawings—Figure 1, is a front view of the machine with the cover of the casing partly removed, Fig. 1ª, is a vertical cross-section of the machine taken on the line x—x of Fig. 1, Fig. 2, is a plan view of Fig. 1, with the cover of the casing partly removed, Fig. 2ª, is a plan and a side view of a modified form of a detail shown in Fig. 2, Fig. 3, is a front view of a modification of the carriage supporting the registering mechanism, with the cover partly removed, Fig. 4, is a plan of Fig. 3, Fig. 5, a side view thereof, Fig. 6, a vertical cross-section of a modification of the machine taken on the line 6—6 of Fig. 7, Fig. 7, is a plan of Fig. 6, with the cover removed, Figs. 8, and 9, are diagrammatical views of the machine shown in Figs. 6 and 7 and illustrating the operation of the machine, on a reduced scale, Fig. 10, is a front view partly in section of the left part of the car-
riage supporting the registering mechanism, the numeral wheels being partly removed, Fig. 11, is a vertical cross-section of a modification of the machine taken on the line 11—11 of Fig. 7, Fig. 12, a front view partly in section of the right part of the carriage of the registering mechanism, the numeral wheels being partly removed, and Fig. 13, is a side view showing a modified form of a detail of Fig. 11.

Referring to the example illustrated in Figs. 1, 1ª and 2 of the drawings, a rotary shaft 63 is mounted in a pair of side walls 61 and 62 of the casing of the machine. The said shaft is operatively connected with the machine crank 64 through spur gears 65 and 66, and it carries a plurality of setting disks 67 each of which is provided with nine radial slots. Within the latter radially shiftable teeth 68 are located which with lateral noses engage in a cam slot formed in a cam disk 69 loosely mounted on the shaft 63. By rotating the said cam disk on the shaft 63 by means of a handle 69' any desired number of the teeth 68 can be shifted into a position beyond the periphery of the setting disks. The number of the teeth 68 shifted beyond the periphery of the setting disks represents the value to be introduced in the calculation in each column of the registering mechanism. In front of the said setting disks, the whole of which may be termed the setting mechanism, numeral wheels 71 are loosely mounted on a shaft 70 disposed parallel to the shaft 63. Each of the said numeral wheels is provided at its circumference with the numerical characters from "1" to "9." and the "0" sign, and one of the said characters of each column of numeral wheels is at a time displayed through a peep hole 72' made in a cover 72 which is common to all the numeral wheels. Each of the numeral wheels 71 has a spur gear 73 secured to its side which is provided with ten teeth, and the latter are in mesh with the teeth of a transmission wheel 74 which is loosely mounted on a shaft 75 disposed parallel to the shaft 70 of the numeral wheels. The said transmission wheels 74 which as shown are mounted on the same axis 75 are located in the plane of the radially shiftable teeth 68 of the setting disks 67, and when rotating the said disks 67 by means of the machine crank 64 the teeth 68 mesh with the teeth of the transmission wheels 74 so as to advance the same. Thereby also the numeral wheels are advanced a distance which corresponds to the number of teeth 68 projected into their operative positions beyond the periphery of the setting disks 67. In order to transmit a certain number to the numeral wheels 71 the operator sets the said number on the setting disks 67, 68, whereupon he rotates the crank 64.

Carrying means are provided between consecutive numeral wheels which shift a numeral wheel forward or backward the distance corresponding to one value, if the numeral wheel of the next lower order passes from its "9" position into its "0" position, or vice versa. In the example illustrated rocking levers 76 having the form of hammers are used for this purpose, which levers are loosely mounted on a shaft 76' disposed parallel to the axis of the registering mechanism, and which extend with their free upper ends to points adjacent to the gear wheels 74. Each of the numeral wheels 71 is provided with a pin 71' which strikes the head 76''' of the hammer 76 so as to rock the latter, when the numeral wheel passes from its "9" position into its "0" position, or vice versa. Thereby a cam face 76'' of the rocking lever 76 is thrown into the path of a laterally shiftable tooth 67' of the coöperating setting disk 67. Upon rotation of the setting disk 67 the cam face 76'' shifts the tooth 67' laterally and into mesh with the teeth of the transmission wheel 74 coöperating with the numeral wheel 71 of the next higher order. Thereby the said numeral wheel 71 is advanced the distance of one value. As, for the purpose of performing additions or subtractions, or multiplications or divisions, the crank can be turned either to the right or to the left, two teeth 67' and cam faces 76'' are provided, only one of which is operative when turning the crank in one direction. At the end of the carrying operation cam faces 67'' rock the levers 76 into their normal positions shown in Fig. 1ᵃ.

At the left of the registering mechanism, and preferably coaxially therewith, a second registering mechanism 78 is provided, the numeral wheels of which are used for counting the revolutions of the machine crank. The said revolutions counting mechanism is actuated from the shaft 63 which at its left end carries a single tooth wheel 79 adapted upon each revolution of the shaft 63 to advance a spur gear 80 the distance of two consecutive teeth. In the position of the registering mechanisms 71, 78 shown in Figs. 1 and 2, the said gear wheel 80 is in mesh with a gearing 81 of the numeral wheel 78 of the lowest order which is located at the right hand end of the set of numeral wheels 78. Therefore the said numeral wheel is advanced a distance corresponding to one value, if the crank of the machine performs a revolution. Each of the numeral wheels is connected with a gearing 81, and all the gear wheels 80 meshing with the gearings 81 are loosely mounted on a shaft 84 disposed parallel to the shaft 70 of the registering mechanism 78. Carrying devices are not required for the revolutions counting mechanism.

Both registering mechanisms 71 and 78 are provided with resetting mechanisms adapted to set the numeral wheels into their zero positions. In the example shown the resetting mechanism is constructed as follows: At its outer end the shaft 70 carries a nut 87, and within each of the numeral wheels 71 it is provided with a radial pin 70'. Each of the numeral wheels is provided with an abutment 71''. In the normal position of the shaft 70 and the abutments 71'' the latter are located out of the path of the pins 70'. Upon rotation of the shaft 70 by means of the nut 87 the shaft 70 is shifted laterally against the action of a spring 89 by means of a cam face 88, so that the pins 70' are shifted into the path of the abutments 71''. Therefore, if the shaft 70 is further rotated, the pins 70' engage the abutments 71'' so as to move the numeral wheels into their zero positions. At the end of the resetting operation the shaft 70 is shifted backward again, so that the pins 70' are again out of engagement with the abutments 71''. Resetting mechanisms of the same construction are provided on the shaft 83 which carries a nut 90 at its outer end. Short sleeves 85 prevent the axial displacement of the wheels 71 and 78.

The registering mechanism 71 and the revolutions counting mechanism are mounted on a carriage 1 adapted to be shifted in a direction parallel to the axis 63. The purpose of this construction is as follows: If it is desired to multiply a certain number, for example 482, with 300, the number 482 is set on the setting mechanism 67, 68, 69, and it is transmitted three hundred times to the registering mechanism 71 by turning the crank 64 three hundred times. The registering mechanism will then display the number 144600, this being the result of the multiplication. Obviously this operation requires much time, and the time required for performing the multiplying operation can considerably be reduced by shifting the registering mechanism laterally in a direction parallel to the axis of the setting mechanism. Thereby the aforesaid multiplication is performed as follows: The number 482 is again set on the setting mechanism 67, 68, 69, whereupon the carriage of the registering mechanism is shifted two spaces to the right in the direction of the arrow 86 shown in Fig. 1, so that the setting disk of the lowest order coöperates with the numeral wheel of the third column from the right. In this position of the carriage 1 each revolution of the crank performs a multiplication of the number 482 set on the setting mechanism with 100. Accordingly the revolutions counting mechanism 78 does not indicate the number "1" but the number "100", because in this position of the carriage 1 the single tooth 79 acts through the transmission gear 80 on the spur gear 81 connected with the numeral wheel 78 of the third column. It appears therefore, that for performing the aforesaid calculation only three operations of the crank 64 are required.

In machines heretofore in use the carriage 1 is shifted laterally by exerting a lateral pressure on a handle provided on the said carriage. In operating the machine this method has proved inconvenient, besides the whole machine is sometimes shifted laterally, and the carriage is liable to be checked in its guide way. Finally the operation requires some time.

The object of the improvements is to provide shifting devices for the carriage of the registering mechanism, whereby the said carriage can be shifted either to the right or to the left by a vertical pressure, or to so connect the same with the crank of the machine, that it is shifted by the said crank without stopping the operation of the setting mechanism. In the example illustrated in Figs. 1 to 5 the carriage 1 is shifted by the hand of the operator.

Referring to the example illustrated in Figs. 1 to 5, the carriage 1 which is adapted to be shifted in the direction of the arrow 86 carries a gear wheel 2 which is mounted on a shaft 3 disposed vertically to the direction of the travel of the carriage. The said gear wheel 2 is in engagement with a toothed rack 5 secured to the stationary base plate 4 and extending in the direction of the travel of the carriage. By rotating the gear wheel 2 the carriage 1 is shifted either to the left or to the right, according to the direction of the rotation of said gear wheel. In the preferred form the pitch of the gearing is such, that when advancing the gear wheel 2 the distance of two consecutive teeth, the carriage is shifted the distance of two consecutive numeral wheels 71 and 78. However, the said pitch may be a fraction or a multiple of the said distance.

The gear wheel 2 is rotated in either direction by means of one of a pair of key levers 6 having a rocking support on a shaft 7 and engaging with one of their ends in the teeth of the gear wheel 2 and provided at their opposite ends and outside the casing of the machine with keys. Both levers 6 may also be used to release a locking device 8 adapted to prevent unintentional displacement of the carriage. Therefore, for shifting the carriage laterally the single operation of one of the levers 6 is required. In the preferred form, the releasing of the locking device of the carriage is effected by means of fingers 9 projecting laterally from the levers 6 and engaging under radial arms 10 of the shaft 7 carrying the locking lever 8. When rocking one of the levers 6, the shaft 7 is carried along and the lever 8 is lifted out of its locking position, while the non-actuated lever 6 is not acted upon. For the purpose of unlocking the carriage without actuating the levers 6 a key lever 11 is splined to the shaft 7. This lever is used, for example, if it is desired to shift the carriage out of the casing of the machine. Preferably the said key lever 11 is connected to a spring 12 which tends to force the locking lever 8 into its locking position.

In their normal positions, the levers 6 must be out of the path of the teeth of the gear wheel 2, because otherwise, upon actuation of the gear wheel by one of the levers 6, the other lever would interfere with the rotation of the gear wheel. Furthermore the end of the levers 6 acting on the gear wheel must yield when the gear has been advanced and the said lever is released, in order to permit the said end to pass backward and along the tooth 14 after having shifted the adjacent tooth 13 (Fig. 1). For this purpose the free ends of the levers 6 are hinged to the said levers so as to be able to be rocked in a vertical direction, as shown in Fig. 2, or they are formed as shown in Fig. 2ª. In the latter case the said ends are formed with cam faces adapted to be acted upon by the teeth of the gear wheel 2 and thereby to be rocked vertically.

In the example illustrated in Figs. 3 to 5 each of the levers 6 is made of a single rigid piece. On the shaft 3 of the gear wheel 2 two pairs of rocking levers 15 are loosely mounted which normally are pulled downward and into engagement with a rigid abutment 16 by means of a spring 17. (Fig. 3.) At their free ends each pair of the levers 15 is provided with a pawl 18 located in the plane of the gear wheel 2. By springs 19, the said pawls are normally held out of engagement with the gear wheel 2 and forced, with noses 18′, in contact with the levers 6. If one of the said levers 6 is depressed, the coöperating pawl 18 is rocked against the action of its spring 19 and into engagement with the teeth of the gear wheel 2, whereupon, when further depressing the key 6, the said pawl carries along the gear wheel 2. The opposite pawl which has not been acted upon by its lever 6 does not interfere with this operation of the gear wheel 2, because it is not moved out of its position of rest shown in Fig. 3. Also in this case the extent of the rocking movement of the levers 6 is preferably such, that each lever when being once completely depressed advances the carriage 1 the distance of two consecutive columns of numeral wheels. In a similar way as described with reference to Figs. 1 and 2, also in this case the levers 6 can be so connected with the carriage locking lever 8, that when being depressed they lift the said lever out of locking position.

While in the foregoing a toothed rack and a gear wheel have been shown and described, it should be understood, that the invention is not limited to such construction, and that other elements may be used for performing the same function, such for example as a chain and a pawl and ratchet mechanism, or a screw spindle and nut, etc.

In Figs. 6 to 10 a machine is illustrated which involves a further improvement of the machine described with reference to Figs. 1 to 5. In the said machine mechanism is provided whereby at the end of a multiplication performed in one column the carriage 1 of the registering mechanism is automatically shifted into the next column. As shown the said mechanism is arranged on the revolutions counting mechanism 78 shown in Figs. 1 and 2. The said mechanism consists of the following elements:

The setting mechanism 67, 68, 69 and the registering mechanism 71 actuated thereby are similar in construction and operation as the setting mechanism 63, 67, 68, 69 and the registering mechanism 71 of the machine shown in Figs. 1 and 2. A further description of the said parts is therefore not necessary.

On the shaft 63 of the setting mechanism 67, 68, 69 and sidewise of the latter a second setting mechanism is located which consists of a plurality of disks 23 loosely mounted on the shaft 63 and a corresponding number of disks 24 rotating with the shaft 24 serving as support-bearings for the disks 23 and disposed one at the side of each of the disks 23. About part of their circumferences the disks 23 are formed with gear teeth 23' which are in mesh with the transmission wheels 80 of the numeral wheels 78 of the revolutions counting mechanism located on the carriage 1 coaxially with the registering mechanism (Figs. 6, 8, and 9). When turning the said disks 23 in the direction of the arrow shown in Fig. 6 by means of their handles 23'' and thereby setting thereon the value of the multiplier in a direction opposite to the setting direction of the ordinary setting disks, the numeral wheels 78 are rotated by means of the transmission gears 80, and they are advanced so many units as correspond to the value of the multiplier, but in a direction which is opposite to their normal direction of rotation, so that, for example in case of a multiplier of the value "6", they are set from the "0" position over the "9" position into the "4" position.

The first one of the disks 24 which rotates with the crank of the machine (the disks 23 do not rotate with the crank 64 and the disks 24), that is the disk which corresponds to the lowermost order, is provided at its circumference with a tooth 30 (Fig. 6) by which the transmission wheels 80, 81 and the numeral wheel 78 corresponding to the position of the carriage 1 of the registering mechanism relatively to the setting mechanism are in the usual way advanced one tooth in the direction from "0" to "1". Therefore the numeral wheels 78 which before were turned in the backward direction are now stepwise returned into their "0" positions by the said tooth 30. The second disk 24 (covered in Fig. 6 by the disk 23 belonging thereto) i. e. the next to the first one which is provided with the tooth 30, is provided at its circumference with a tooth 32, as appears from Fig. 6. By means of the said teeth levers 33 can be rocked which upon such rocking movement shift the carriage 1 by any preferred means. However, such shifting movement must take place only when the calculating operation is completed in the particular column, and the corresponding revolutions counting wheel 78 has been returned into its zero position. Therefore the mechanism is constructed in such a way, that the operative tooth 32 does not strike the lever 33 coöperating therewith, unless the latter has been pushed by a pin 36 of the corresponding revolutions counting mechanism into the path of said tooth. This is effected by means of a device constructed as follows:

At the side of each of the levers 33 a lever 35 is loosely mounted on the shaft 34, and the free end of the said lever extends into the path of the pin 36 secured to the numeral wheel 78. A pin 37 of the lever 35 engages the lever 33 in such a way, that it rocks the said lever into the path of the teeth 32, if the lever 35 is lifted by the pin 36 of the numeral wheel, as is the case when the wheel passes from its "9" position into its "0" position. When the lever 33 is thus rocked by the arm 35 and turned by the tooth 32, a pin 38 projecting laterally from the lever 33 strikes a radial pin or arm 39 secured to the shaft 34, whereby the shaft 34 and a lever 40 splined thereto are rocked. The said lever or arm 40 engages below a nose 18' of the pawl 18, so that the arm 40 when taken along by the lever 33 forces the pawl 18 into engagement with the teeth of the gear wheel 2 so as to rotate the latter. The said gear wheel which is in mesh with the toothed rack 5 advances the carriage in the direction of the arrow 41 shown in Fig. 8. At the end of the calculation all the wheels 78 of the revolutions counting mechanism are returned into their zero positions.

If it is desired to have the multiplier appear on the machine at the end of the calculating operation, a second revolutions counting mechanism may be added to the mechanism 78 counting the revolutions of the crank of the machine. The said second revolutions counting mechanism indicates the revolutions of the crank, as is known in the art. It can be disposed either on the carriage 1 or within the upper part of the casing of the machine, as indicated at 23''' in Fig. 8. The indicating mechanism 69''' (Fig. 8) controls the setting of the setting mechanism 67, 68, 69 in well known manner.

In the example so far described, the setting disks 23 of the subsidiary setting mechanism are constantly in engagement with the transmission gears 80 of the revolutions counting mechanism broad enough for simultaneously engaging with the tooth 30, so that upon each revolution of the crank they are turned backward the distance of two consecutive teeth by the action of the tooth 30 on the transmission gears 80. However, the mechanism may be so constructed, that the gears 80 and the disks 23 are thrown out of engagement with each other during the revolutions of the crank for example by axially displacing the disks 23. In this case the setting disks 23 remain in their set positions and in engagement with the transmission gears 80 to the end of the calculation. If now the disks 23 are reset, the multiplier appears on the counting mechanism 78. In this case, the teeth 23' and the disks 80 must be thrown out of engagement with each other when resetting the counting mechanism. The rocking movement may also be imparted to the lever 40 directly from the pin 36 of the counting mechanism 78. However, the construction described before is preferable, because the way of the engagement of the teeth 32 with the lever 33 is considerably larger than that of the pin 36, and because the power exerted by the crank is larger at the circumference of the large disk 23 than at the circumference of the small disk 78.

Instead of securing the pins 36 to the numeral wheels 78 they may be secured to other wheels coöperating with said wheels, for example to the transmission wheels 80.

The slots 23'''' provided for the handles 23'' of the subsidiary counting mechanism in the casing of the machine may be formed with lateral notches or other arresting means adapted to receive the said handles. The handles may be pressed into the said notches by springs, and locked in their proper positions against unintentional displacement which might be caused for example by the revolutions of the crank.

In order to enable the carriage to be shifted in such cases in which the multiplier comprises the "0" in one of its places, and in which therefore the crank is not rotated in the column corresponding to this place, the second setting disk 24 of the subsidiary setting mechanism is preferably provided with a plurality of teeth 32 (Fig. 6) acting one after the other in such a way, that after the first one of said teeth has advanced the carriage one step, the second tooth acting in the new position of the carriage advances the latter a second step upon the same operation of the crank.

In Figs. 7, 11, and 12 mechanism is shown, whereby at the end of a division or subtraction performed in one column the carriage of the registering mechanism is automatically shifted by the crank of the machine. As shown in the said figures, on the shaft 76' of the carrying levers 76 levers 46 are loosely mounted which with one of their ends extend into the paths of pins 47 secured to the numeral wheels 71 of the main registering mechanism, and which by the said pins are pressed downward and out of their normal positions, whenever the corresponding numeral wheel is in its zero position. The opposite end of the said lever 46 is provided with a lateral pin 48 the upper face of which is engaged by a rock arm 49 loosely mounted on the shaft 76'. If the lever 46 is depressed by the pin 47 of the numeral wheel 71, the arm 49 is rocked in the direction of the arrow 50, and into the path of a tooth 53 (Fig. 11) which has been forced outward beyond the periphery of the setting disk 67 by any preferred means, for example by means of the adjacent cam disk 69 which also shifts the teeth 68 of the setting mechanism. The said tooth 53 carries along the arm 49, so that the latter, by means of a pin 54 engaging at the rear of a radial pin 55, rocks the shaft 76' and moves a crank arm 55' splined to the latter downward. From the latter the shifting movement of the carriage may be derived in any preferred way. In the example shown, the crank arm 55' engages one arm of a lever 56 the opposite arm of which engages below the pawl 18. If therefore the arm 55' is swung downward, the pawl 18 is thrown into engagement with the teeth of the gear wheel 2 mounted on the shaft 3, so as to rotate said gear wheel. As shown, the pawl 18 is mounted on links 15 loosely engaging the shaft 3. The gear wheel 2 is in mesh with the toothed rack 5 secured to the carriage of the registering mechanism, so that the said carriage can be shifted by the gear wheel. The lever 56 can be disposed on a shaft of its own, or, as shown in Figs. 7, 11 and 12, on the shaft 3 of the gear wheel 2. With its end 56' bent at an angle it engages below a horizontal arm 18' of the pawl 18, so that upon the upward movement of its front end by means of the lever 55' it first rocks the pawl 18 into engagement with the gear wheel 2 against the action of a spring 19, and thereupon lifts the same. Normally the pawl 18 is out of engagement with the teeth of the wheel 2, because otherwise it would interfere with the rotation of the same when the carriage is shifted by hand, or when in case of multiplications, the said gear is rotated from the machine crank in the opposite direction. The machine is also provided with the pair of key levers 6 rocking about the shaft 7 and engaging below the arms 18' of the pawls 18, which has been described with reference to Figs. 1 and 2. Therefore when depressing one of the said key levers, the carriage is shifted either to the right or to the left.

When operating the machine, the tooth 53 of the lowermost one of the setting disks 67 in which no values are set is moved into its operative position by a short back movement of its setting lever 69'. If for example it is desired to divide the number 25770509 by the number 73841, the number 25770509 is first set on the setting mechanism 67, 68, 69 and transmitted to the main registering mechanism H by a revolution of the crank in the + direction, as is usual in machines of this class. Now the said number is removed from the setting mechanism and replaced by the number 73841. After resetting the revolutions counting mechanism, which according to the single revolution of the crank indicates the number "1", the carriage 1 is shifted to the right in such a position, that the number "7" of the value 73841 is above the "5" of the highest order of the value 25770509 set on the registering mechanism H, for which purpose the carriage is shifted two steps to the right. Before beginning the division, which consists in turning the crank 64 of the machine in the minus direction, in the lowermost one of the setting disks 67 which have not been set, that is in the present example in the disk situated at the left of the divider 73841, the tooth 53 is shifted into its operative position beyond the periphery of the setting mechanism, for which purpose the cam disk 69 is turned backward. If now the division is performed, and the crank has three times been turned to the left, at the highest place of the number 25770509, the "0" sign is displayed instead of the number "2" (after first showing the "1"). When the said numeral wheel passes from the value "1" to the value "0", the pin 47 connected therewith rocks the arm 49 into the path of the tooth 53 revolving with the setting mechanism which is in front of this numeral wheel, whereby the carriage is shifted one step to the left. In the remaining columns the operation is the same, when the highest number wheel 71 passes from "1" to "0". The last displacement which is possible, and which shifts the carriage arrives in its position of rest can be indicated by any preferred means, for example by a visible or audible sign.

Instead of securing the pins 47 to the numeral wheels 71, they may be secured to other wheels connected therewith, for example to the transmission gears 74.

As shown in Fig. 7, the mechanism provided on the calculating machine for automatically shifting the carriage in case of multiplications may be coupled in case of divisions with the aforesaid mechanism for shifting the carriage 1. In this case the arm 40 which corresponds to the arm 55' and which shifts the carriage in case of multiplications, is mounted with the arm 55' on a common shaft, and the arm which in a calculation is out of operation is prevented from being moved with the operative arm by means of a clutch mechanism 58 adapted to couple either one of the said arms with the said shaft, and shifted by the operator according to the calculation to be performed. The clutch may also be actuated from certain elements operated in a different sense in case of multiplications and divisions, for example from the setting operation of the tooth 53, which precedes the calculation.

In order to permit a further shifting movement of the carriage without a special revolution of the crank in cases where after a shifting movement of the carriage the divisor is still larger than the dividend, the setting disks 67 are preferably provided with a plurality of teeth, for instance with three teeth 53', 53'', 53''' (Fig. 13). If the first one 53' of the said teeth has shifted the carriage one step, the second tooth 53'' shifts the carriage a second step in the new column and by the same operation of the crank.

The following example will further illustrate the operation of the machine. If the following division is performed on the machine

41637 : 411
411.
─────
005, the first tooth 53' strikes the lever 49 (Fig. 11), whereby the carriage is shifted one step. After this shifting movement and during the same revolution of the crank the second tooth 53'' strikes the lever 49 of the next lower order, so that the carriage is shifted a further step.

It may happen, that during a revolution of the crank the "0" appears in the highest place affected by the position of the carriage, before the remainder is smaller than the divisor. This is the case for example at the end of the third revolution of the crank, when performing the calculation:

$$298 : 7 = 3$$
$$21$$
$$\overline{\phantom{00}8.}$$

In such cases the carriage must not yet be shifted, though the "0" is displayed. Therefore the mechanism must be readjusted by the operator. In such cases in which the carriage is shifted before the remainder appearing on the counting mechanism is smaller than the divisor, the operator must shift the carriage backward one step, or he must prevent the shifting movement of the same in any way, for example by with-drawing the tooth 53 by means of the handle 69'.

Claims:

1. In a calculating machine, the combination with a setting mechanism, and a registering mechanism adapted to be shifted longitudinally of the setting mechanism, of a toothed rack and a spur gear coöperating therewith, said toothed rack and spur gear being connected with the machine frame and the registering mechanism respectively, and means for rotating said spur gear in either direction and adapted to be thrown into engagement with the teeth of said spur gear.

2. In a calculating machine, the combination with a setting mechanism and a registering mechanism shiftable longitudinally of the setting mechanism, of shifting mechanism for the registering mechanism and embodying gear means respectively connected to the machine frame and the registering mechanism, and a vertically movable rocking lever for actuating the part of the gear means connected to the registering mechanism.

3. In a calculating machine, the combination with a setting mechanism, and a registering mechanism adapted to be shifted longitudinally of the setting mechanism, of a toothed rack and a spur gear coöperating therewith, said toothed rack and spur gear being connected with the machine frame and the registering mechanism respectively, means for rotating said spur gear in either direction and adapted to be thrown into engagement with the teeth of said spur gear, and vertically movable rocking levers adapted to actuate said means for rotating the spur gear.

4. In a calculating machine, the combination with a setting mechanism, and a registering mechanism adapted to be shifted longitudinally of the setting mechanism, of a toothed rack and a spur gear coöperating therewith, said toothed rack and spur gear being connected with the machine frame and the registering mechanism respectively, means for rotating said spur gear in either direction and adapted to be thrown into engagement with the teeth of said spur gear, locking means for arresting said registering mechanism in its position, and operative connections between said means for rotating the spur gear and said locking means adapted to throw the locking means in non-locking position upon actuation of the rotating means.

5. In a calculating machine, the combination with a setting mechanism, a registering mechanism, and means for shifting said registering mechanism longitudinally of the setting mechanism, of a revolutions counting mechanism adapted to be set before starting the calculation, means operative upon the operation of the machine to stepwise shift said revolutions counting mechanism into its initial position, a normally inoperative connection between the machine crank and said shifting means for the registering mechanism, and means actuated by said revolutions counting mechanism upon arrival in its initial position to make said connection operative.

6. In a calculating machine, the combination with a setting mechanism, and a registering mechanism adapted to be shifted longitudinally of the setting mechanism, of a revolutions counting mechanism comprising setting disks and numeral wheels adapted to be rotated upon the setting operation of the setting disks, means actuated upon each operation of the machine to stepwise reurn said numeral wheels into their initial positions, normally inoperative rockers adapted when thrown into operative position to be rocked by the operation of the machine and to shift the registering mechanism, and means on said numeral wheels adapted upon their arrival in their initial positions to throw an adjacent rocker into operative position.

7. In a calculating machine, the combination with a setting mechanism, a registering mechanism adapted to be shifted longitudinally of the setting mechanism, of numeral wheels, setting disks loosely mounted on the crank shaft of the machine and provided with teeth operatively connected with the numeral wheels and adapted to transmit their setting movement to the numeral wheels, disks secured to the crank shaft of the machine and each having a tooth, normally inoperative rockers adapted to shift the registering mechanism when acted upon by one of said teeth, and means on said numeral wheels adapted upon their arrival in their initial positions to throw an adjacent rocker into operative position.

8. In a calculating machine, the combination with a setting mechanism, a registering mechanism adapted to be shifted longitudinally of the setting mechanism, of numeral wheels, setting disks loosely mounted on the crank shaft of the machine and provided with teeth operatively connected with the numeral wheels and adapted to transmit their setting movement to the numeral wheels, disks secured to the crank shaft of the machine and each having a tooth, normally inoperative rockers adapted to shift the registering mechanism when acted upon by one of said teeth, means on said numeral wheels adapted upon their arrival in their initial positions to throw an adjacent rocker into operative position, and means to disconnect said numeral wheels from said setting disks.

9. In a calculating machine, the combination with setting disks, and numeral wheels adapted to be rotated according to the values set on the setting disks, of normally inoperative mechanism to shift said numeral wheels relatively to the setting disks, means connected with said numeral wheels to throw said shifting mechanism into operative position, and shiftable elements rotated by the crank of the machines adapted to actuate said shifting mechanism.

In testimony whereof I have hereunto set my hand in presence of two subscribing witnesses.

FRIEDRICH NAUMANN. [L. S.]

Witnesses:
OTTO KÖNIG,
WILLY KLEIN.

---

Correction in Letters Patent No. 967,821

It is hereby certified that the residence of the assignee in Letters Patent No. 967,821, granted August 16, 1910, upon the application of Friedrich Naumann, of Hagen, Germany, for an improvement in "Calculating-Machines," was erroneously written and printed "Hagen, Germany," whereas said residence should have been written and printed *Braunschweig, Germany;* and that the said Letters Patent should be read with this correction therein that the same may conform to the record of the case in the Patent Office.

Signed and sealed this 25th day of October, A. D., 1910.

[SEAL.]

E. B. MOORE,
*Commissioner of Patents.* wheels, setting disks loosely mounted on the crank shaft of the machine and provided with teeth operatively connected with the numeral wheels and adapted to transmit their setting movement to the numeral wheels, disks secured to the crank shaft of the machine and each having a tooth, normally inoperative rockers adapted to shift the registering mechanism when acted upon by one of said teeth, means on said numeral wheels adapted upon their arrival in their initial positions to throw an adjacent rocker into operative position, and means to disconnect said numeral wheels from said setting disks.

9. In a calculating machine, the combination with setting disks, and numeral wheels adapted to be rotated according to the values set on the setting disks, of normally inoperative mechanism to shift said numeral wheels relatively to the setting disks, means connected with said numeral wheels to throw said shifting mechanism into operative position, and shiftable elements rotated by the crank of the machines adapted to actuate said shifting mechanism.

In testimony whereof I have hereunto set my hand in presence of two subscribing witnesses.

FRIEDRICH NAUMANN. [L. S.]

Witnesses:
OTTO KÖNIG,
WILLY KLEIN.

---

Correction in Letters Patent No. 967,821

It is hereby certified that the residence of the assignee in Letters Patent No. 967,821, granted August 16, 1910, upon the application of Friedrich Naumann, of Hagen, Germany, for an improvement in "Calculating-Machines," was erroneously written and printed "Hagen, Germany," whereas said residence should have been written and printed *Braunschweig, Germany;* and that the said Letters Patent should be read with this correction therein that the same may conform to the record of the case in the Patent Office.

Signed and sealed this 25th day of October, A. D., 1910.

[SEAL.]

E. B. MOORE,
*Commissioner of Patents.*

It is hereby certified that the residence of the assignee in Letters Patent No. 967,821, granted August 16, 1910, upon the application of Friedrich Naumann, of Hagen, Germany, for an improvement in "Calculating-Machines," was erroneously written and printed "Hagen, Germany," whereas said residence should have been written and printed *Braunschweig, Germany;* and that the said Letters Patent should be read with this correction therein that the same may conform to the record of the case in the Patent Office.

Signed and sealed this 25th day of October, A. D., 1910.

[SEAL.]

E. B. MOORE,
*Commissioner of Patents.*